(12) United States Patent (10) Patent No.: US 9,519,913 B2
Calman et al. (45) Date of Patent: *Dec. 13, 2016

(54) PROVIDING SOCIAL IMPACT INFORMATION ASSOCIATED WITH IDENTIFIED PRODUCTS OR BUSINESSES

(71) Applicant: BANK OF AMERICA CORPORATION, Charlotte, NC (US)

(72) Inventors: Matthew A. Calman, Charlotte, NC (US); Erik Stephen Ross, Charlotte, NC (US); Alfred Hamilton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,507

(22) Filed: May 19, 2016

(65) Prior Publication Data

US 2016/0267507 A1 Sep. 15, 2016

Related U.S. Application Data

(63) Continuation of application No. 13/342,055, filed on Jan. 1, 2012, now Pat. No. 9,406,031.

(Continued)

(51) Int. Cl.

| G06Q 10/00 | (2012.01) |
|---|---|
| G06Q 30/00 | (2012.01) |
| G06Q 30/02 | (2012.01) |
| H04L 29/08 | (2006.01) |
| G06Q 30/06 | (2012.01) |

(Continued)

(52) U.S. Cl.
CPC ..... *G06Q 30/0203* (2013.01); *G06F 17/30864* (2013.01); *G06Q 10/00* (2013.01); *G06Q 30/02* (2013.01); *G06Q 30/0201* (2013.01); *G06Q 30/0631* (2013.01); *G06Q 30/0643* (2013.01);

(Continued)

(58) Field of Classification Search
None
See application file for complete search history.

(56) References Cited

U.S. PATENT DOCUMENTS

| 6,173,269 B1 | 1/2001 | Solokl et al. |
| 7,016,532 B2 | 3/2006 | Boncyk et al. |

(Continued)

OTHER PUBLICATIONS

F. Zhou, H.B.-L. Duh, and M. Billinghurst, "Trends in Augmented Reality Tracking, Interaction and Display: A Review of Ten Years of ISMAR," Proc. Seventh IEEE and ACM Int'l Symp. Mixed and Augmented Reality (ISMAR '08), pp. 193-202, Sep. 2008.*

(Continued)

*Primary Examiner* — Timothy Padot
(74) *Attorney, Agent, or Firm* — Michael A. Spring; Moore & Van Allen PLLC; W. Kevin Ransom

(57) ABSTRACT

Embodiments of the invention are directed to methods and apparatuses for capturing a real-time video stream using a mobile computing device, determining, using a computing device processor, which images from the real-time video stream are associated with goods and businesses consistent with a predetermined social impact, and presenting on a display of the real-time video stream, one or more indicators, each indicator being associated with an image determined to be consistent with a predetermined social impact.

36 Claims, 9 Drawing Sheets

Related U.S. Application Data

(60) Provisional application No. 61/478,403, filed on Apr. 22, 2011, provisional application No. 61/450,213, filed on Mar. 8, 2011.

(51) Int. Cl.
*G06F 17/30* (2006.01)
*H04W 4/02* (2009.01)
*G06Q 50/00* (2012.01)

(52) U.S. Cl.
CPC ............. *H04L 67/306* (2013.01); *H04W 4/02* (2013.01); *G06Q 30/0625* (2013.01); *G06Q 50/01* (2013.01)

(56) References Cited

U.S. PATENT DOCUMENTS

| | | |
|---|---|---|
| 7,155,228 B2 | 12/2006 | Rappaport et al. |
| 7,162,438 B1 | 1/2007 | Kelly et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,680,324 B2 | 3/2010 | Boncyk et al. |
| 7,775,437 B2 | 8/2010 | Cohen |
| 7,792,738 B2 | 9/2010 | Channell |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 8,138,930 B1 | 3/2012 | Heath |
| 8,190,732 B1* | 5/2012 | Cooley ................. G06Q 30/08 705/26.3 |
| 8,301,501 B1 | 10/2012 | Glaeser et al. |
| 8,547,401 B2 | 10/2013 | Mallinson et al. |
| 8,610,766 B2 | 12/2013 | Ding et al. |
| 8,660,951 B2 | 2/2014 | Calman et al. |
| 2003/0063292 A1 | 4/2003 | Mostafavi |
| 2003/0064705 A1 | 4/2003 | Desiderio |
| 2004/0015983 A1 | 1/2004 | Lemmons |
| 2004/0021584 A1 | 2/2004 | Hartz, Jr. et al. |
| 2004/0024709 A1 | 2/2004 | Yu et al. |
| 2004/0229611 A1 | 11/2004 | Chun |
| 2005/0201510 A1 | 9/2005 | Mostafavi |
| 2005/0246457 A1 | 11/2005 | Parry et al. |
| 2006/0100897 A1* | 5/2006 | Halloran, Jr. ...... G06Q 10/0635 705/7.28 |
| 2006/0100951 A1 | 5/2006 | Mylet et al. |
| 2007/0140595 A1 | 6/2007 | Taylor et al. |
| 2007/0294721 A1 | 12/2007 | Haeuser et al. |
| 2008/0040278 A1 | 2/2008 | DeWitt |
| 2008/0120639 A1 | 5/2008 | Walter et al. |
| 2008/0148320 A1 | 6/2008 | Howcroft |
| 2008/0192048 A1 | 8/2008 | Nabais Nobre |
| 2008/0214210 A1 | 9/2008 | Rasanen et al. |
| 2008/0268876 A1* | 10/2008 | Gelfand ................. G06Q 30/02 455/457 |
| 2009/0094125 A1 | 4/2009 | Killian et al. |
| 2009/0102859 A1 | 4/2009 | Athsani et al. |
| 2009/0106317 A1* | 4/2009 | Letendre-Hedlund G06Q 10/06393 |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0204511 A1 | 8/2009 | Tsang |
| 2009/0250515 A1 | 10/2009 | Todd et al. |
| 2009/0254440 A1 | 10/2009 | Pharris |
| 2010/0100253 A1* | 4/2010 | Fausak ................. G01D 4/002 700/295 |
| 2010/0185529 A1 | 7/2010 | Chesnut et al. |
| 2010/0217651 A1* | 8/2010 | Crabtree ................ G06Q 10/00 705/7.22 |
| 2010/0250581 A1 | 9/2010 | Chau |
| 2010/0257448 A1 | 10/2010 | Squires |
| 2011/0022540 A1 | 1/2011 | Stern et al. |
| 2011/0034176 A1 | 2/2011 | Lord et al. |
| 2011/0113343 A1 | 5/2011 | Trauth |
| 2011/0119155 A1 | 5/2011 | Hammad et al. |
| 2011/0202466 A1 | 8/2011 | Carter |
| 2011/0258121 A1 | 10/2011 | Kauniskangas et al. |
| 2012/0066026 A1* | 3/2012 | Dusig .................... G06Q 30/02 705/7.32 |
| 2012/0075450 A1 | 3/2012 | Ding et al. |
| 2012/0229624 A1 | 9/2012 | Calman et al. |
| 2012/0229625 A1 | 9/2012 | Calman et al. |
| 2012/0229647 A1 | 9/2012 | Calman et al. |
| 2012/0229657 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233015 A1 | 9/2012 | Calman et al. |
| 2012/0233025 A1 | 9/2012 | Calman et al. |
| 2012/0233032 A1 | 9/2012 | Calman et al. |
| 2012/0233033 A1 | 9/2012 | Calman et al. |
| 2012/0233072 A1 | 9/2012 | Calman et al. |
| 2012/0233089 A1 | 9/2012 | Calman et al. |
| 2012/0299961 A1 | 11/2012 | Ramkumar et al. |
| 2013/0182010 A2 | 7/2013 | Schoeller et al. |

OTHER PUBLICATIONS

Squire, Kurt, and Eric Klopfer. "Augmented reality simulations on handheld computers." The journal of the learning sciences 16.3 (2007): 371-413.*
Brody, A.B. (1999), Pocket Bargain Finder: A Handheld Device for Augmented Commerce. Handheld and Ubiquitous Computing, First International Symposium, HUC'99 Karlsruhe, Germany, Sep. 27-29, 1999 Proceedings, pp. 44-51. Retrieved from https://search.proquest.com/professional/docview/729929360/briefcitation/1510901369B4C7OB.
International Search Report and Written Opinion, corresponding to International Application No. PCT/US2012/028008, dated Jun. 4, 2012.
International Preliminary Report on Patentability for International Application No. PCT/US2012/027912, dated Sep. 19, 2013.
International Preliminary Report on Patentability for International Application No. PCT/US2012/028036, dated Sep. 19, 2013.
International Preliminary Report on Patentability for International Application No. PCT/US2012/028008, dated Sep. 19, 2013.
International Preliminary Report on Patentability for International Application No. PCT/US2012/027890, dated Sep. 19, 2013.
International Preliminary Report on Patentability for International Application No. PCT/US2012/027892, dated Sep. 19, 2013.
International Search Report and Written Opinion, corresponding to International Application No. PCT/US2012/127890, dated Feb. 5, 2013.
International Search Report and Written Opinion, corresponding to International Application No. PCT/US2012/048697, dated Sep. 24, 2012.
International Search Report and Written Opinion, corresponding to International Application No. PCT/US2012/028036, dated Jun. 4, 2012.

(56) References Cited

OTHER PUBLICATIONS

International Preliminary Report on Patentability for International Application No. PCT/US2012/048697 dated Feb. 4, 2014.
Jayne O'Donnell and Christine Dugas. More retailers go for green—the eco kind ; Home Depot tags friendly products: [Final Edition]. USA Today [McLean, Va] Apr. 18, 2007: B.3.

\* cited by examiner

PROVIDING SOCIAL IMPACT INFORMATION ASSOCIATED WITH IDENTIFIED PRODUCTS OR BUSINESSES

CROSS-REFERENCE TO RELATED APPLICATIONS

This application is a continuation of U.S. patent application Ser. No. 13/342,055, filed Jan. 1, 2012, of the same title which claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,403, filed Apr. 22, 2011, entitled "Providing Social Impact Information Associated with Identified Products or Businesses," the entirety of each of which is incorporated herein by reference.

BACKGROUND

Modern handheld mobile devices, such as smart phones and the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common as standardized features. Such features include, but are not limited to, location-determining devices, such as Global Positioning System (GPS) devices; sensor devices, such as accelerometers; and high-resolution video cameras.

As the hardware capabilities of such mobile devices have increased, so to have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing".

Consumers are also increasingly interested in the social impact of the products they purchase and the businesses they frequent. For example, many consumers are interested in the environmental impact created by the manufacture and sale of the products and services they purchase, some consumers are interested in purchasing goods and services produced locally or from a specific geographic location, others desire to purchase goods that have not been manufactured with child labor or that incorporate resources from a specific geographic location. It can be difficult for consumers to identify the social impact of specific products and businesses at the point where (and when) most purchasing decisions are made, such as when comparing products in a store or walking down a street and trying to determine which service provider's store to enter.

Therefore, a need exists to implement real-time video analysis, i.e., AR or the like, to assist the user of mobile devices with providing the social impact of specific goods and services.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using real-time video analysis, such as AR or the like to assist the user of mobile devices with identifying products and businesses that are consistent with the user's social values. Through the use of real-time image object recognition, objects, logos, artwork, products, text, locations and other features that can be recognized in a real-time video stream can be matched to data associated with such objects to assist the user with identifying the social impact of specific products and businesses. In specific embodiments, the data that is used to match to the images in the real-time video stream is specific to financial institutions, such as customer financial behavior history, customer purchase power/transaction history and the like. In this regard, some of the embodiments herein disclosed utilize financial institution data, which is uniquely specific to financial institutions, in providing information to mobile devices users in connection with real-time video stream analysis. These embodiments are exemplary.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

Some embodiments of the present invention provide a method wherein one or more goods or service providers proximate in location to a mobile device are identified by a processor (e.g. the processor of the mobile device). It is then determined which goods or service providers proximate in location to the mobile device are consistent with a predetermined social impact. The mobile device then presents on a display the one or more indicators associated with a good or service provider determined to be consistent with the predetermined social impact profile. In certain embodiments, identifying one or more goods or service providers involves capturing, via the mobile device, a real-time video stream, wherein the real-time video stream includes at least one image of a good or service provider. In such embodiments, the processor may implement object recognition processing to identify the goods or service providers within the real-time video stream.

In other embodiments, identifying one or more goods or service providers involves capturing a code located on, or proximate to, one or more products or service providers, wherein the code identifies the product or service provider. In yet other embodiments, the one or more goods or service providers consistent with a predetermined social impact are identified by receiving, via the mobile device, wireless communication from a product identifying tag or service provider tag associated with the goods or service provider. Consistent with certain embodiments, identifying one or more goods or service providers further comprises determining the location of the mobile device and determining via the processor, the one or more goods or service providers based on the determined location.

In certain embodiments the mobile device is a mobile phone. In some embodiments the real-time video stream is captured by the same mobile device that presents the one or more indicators.

In some embodiments of the invention, determining which goods or service providers proximate in location to the mobile device are consistent with a predetermined social impact involves the steps of using a device to collect data concerning the social values of importance to the user (e.g., current or aggregate of data of importance to the user) and using a processor to generate a social impact profile for the user based on the collected data. In some embodiments, the processor then identifies the goods and service providers captured in a real-time video stream, correlates those goods and service providers to information regarding the social impact of the goods and service providers and compares the information regarding the social impact of the goods and service providers to the social impact profile of the user.

Consistent with certain embodiments of the invention, the method for collecting data concerning the social values of greatest importance to the user can involve using a computer or mobile device for collecting user defined data concerning the social values of importance to the user. The user defined data may include, among other things, responses to survey questions and search terms provided by the user for correlation to the goods and service providers identified in the real-time video stream.

In some embodiments, the method for collecting data concerning the social values of greatest importance to the user comprises utilizing a processor to analyze the purchasing behavior of the user and identify the social values of importance to the user from the user's purchasing behavior. Such purchasing behavior may comprise financial records available to a financial institution.

In some embodiments of the invention, the method for collecting data concerning the social values of greatest importance to the user can involve collecting personal data associated with the user, via a processor, and identifying the social values of importance to the user from the collected personal data. Such personal data may comprise data available to a financial institution, such as data available in financial records held by a financial institution.

In certain embodiments, presenting one or more indicators on the display of a mobile device, wherein each indicator is associated with a good or service provider proximate in location to the mobile device determined to be consistent with the predetermined social impact comprises superimposing the indicator over the real-time video stream presented on the display. In some embodiments the indicators are selectable by the user. Selecting the indicators may in some embodiments present the user with additional information about the goods or service provider or present the user with an option to purchase, via the mobile device, one or more of the goods or a service provided by the service provider.

Embodiments of the invention also provide an apparatus where the apparatus has a device for capturing a real-time video stream, a processor, operably connected to the device and configured to determine which images from the real-time video stream are associated with goods or service providers consistent with a predetermined social impact profile and a display operably connected to the processor for presenting the real-time video stream with one or more indicators, each indicator being associated with an image determined to be consistent with the predetermined social impact profile.

In some embodiments of the invention the processor is further configured to collect data concerning the social values of importance to the user; that data is collected in some embodiments through user defined data, in some embodiments by analyzing the purchasing behavior of the user and in some embodiments by collecting personal data associated with the user. The processor is also configured to use the collected data to generate a social impact profile for the user, identify goods and service providers captured in the real-time video stream, correlate the goods and service providers to information regarding the social impact of each good and business and assign the goods and businesses a social impact profile. Then the processor correlates the social impact provider for the user to the social impact profile of the goods or service provider. In certain embodiments the social impact of the goods or service providers comprise one or more of an environmental impact, nature of production, product attributes, business attributes or charitable activities. The user defined data in certain embodiments will be responses to survey questions or search terms inputted by the user along with the user's desired correlation between the inputted search terms and the goods or service providers. The apparatus may collect data concerning the social values of importance to the user through purchasing behavior, wherein such data comprises the financial records available to a financial institution. In certain embodiments, the apparatus may collect data concerning the social values of importance to the user by collecting personal data associated with the user, such as data available to a financial institution.

In certain embodiments of the apparatus, the one or more indicators presented on the display are superimposed over the real-time video stream presented on the display. In some embodiments the indicators are selectable by the user and may present the user with additional information about the goods or service provider or present the user with an option to purchase, via the device, one or more of the goods or a service provided by the service provider.

Embodiments of the invention also provide a computer program product comprising a non-transitory computer-readable medium having computer-executable code stored thereon. In one embodiment, the computer-executable code includes: a first code portion configured to capture, via a mobile device, a real-time video stream, a second code portion configured to determine which images from the real-time video stream are associated with goods or service providers consistent with a predetermined social impact profile and a third code portion configured to present on a display the real-time video stream with one or more indicators, each indicator associated with an image determined to be consistent with the predetermined social impact profile.

In certain embodiments the second code portion of the computer program product is further configured to collect data concerning the social values of importance to the user, generate a social impact profile for the user and identify the goods and service providers captured in the real-time video stream. The second code portion may then correlate the goods or service providers identified in the video stream to information regarding the social impact of the goods and service providers and compare the information regarding the social impact of the goods and service providers to the social impact profile of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
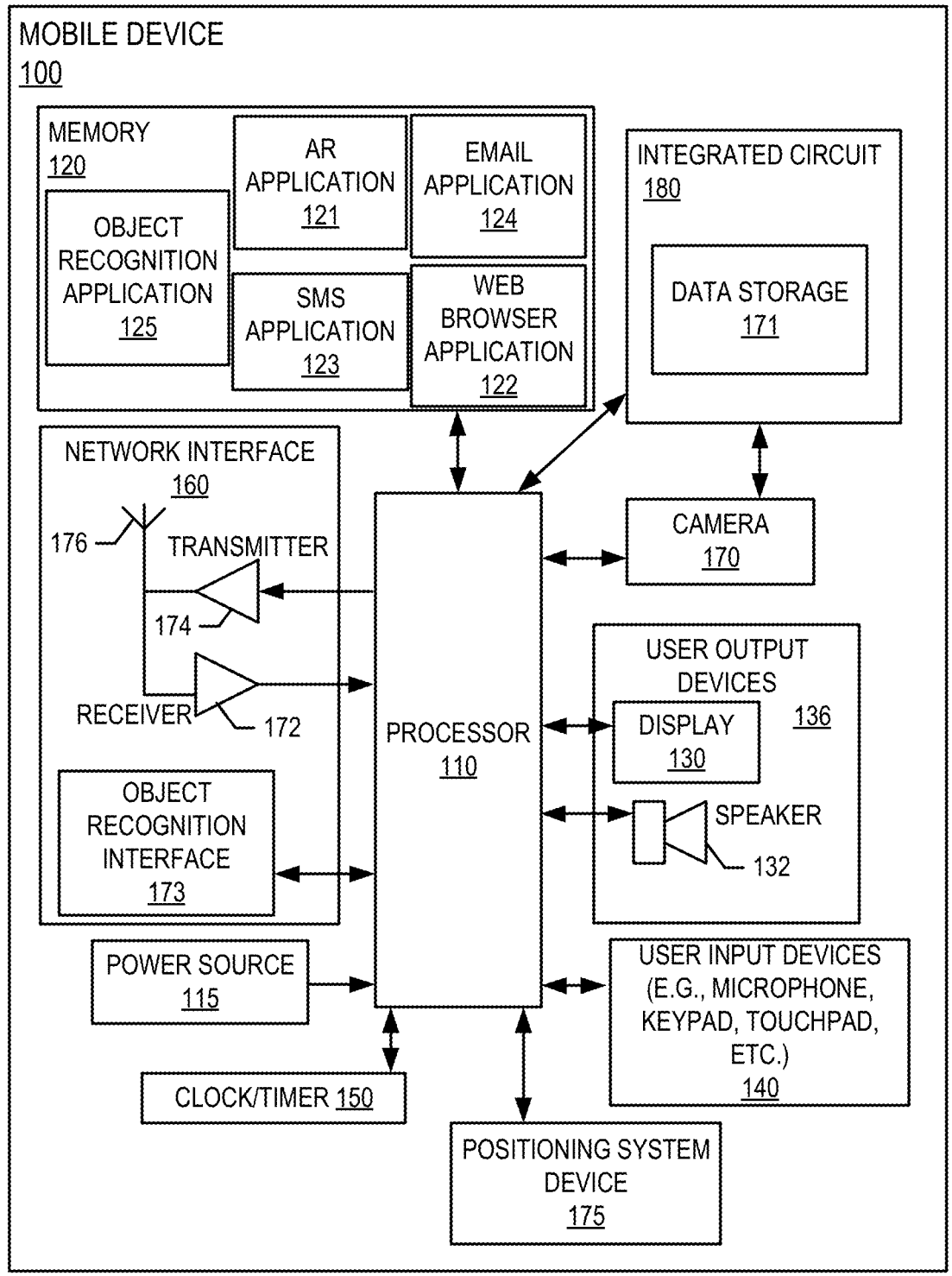
Figure 2:
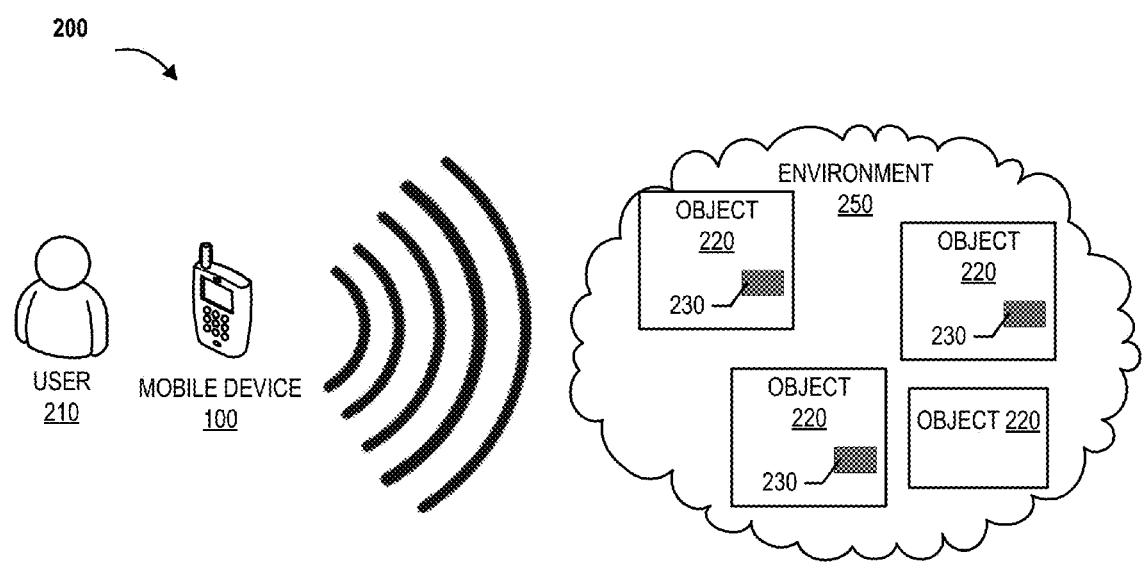
Figure 3:
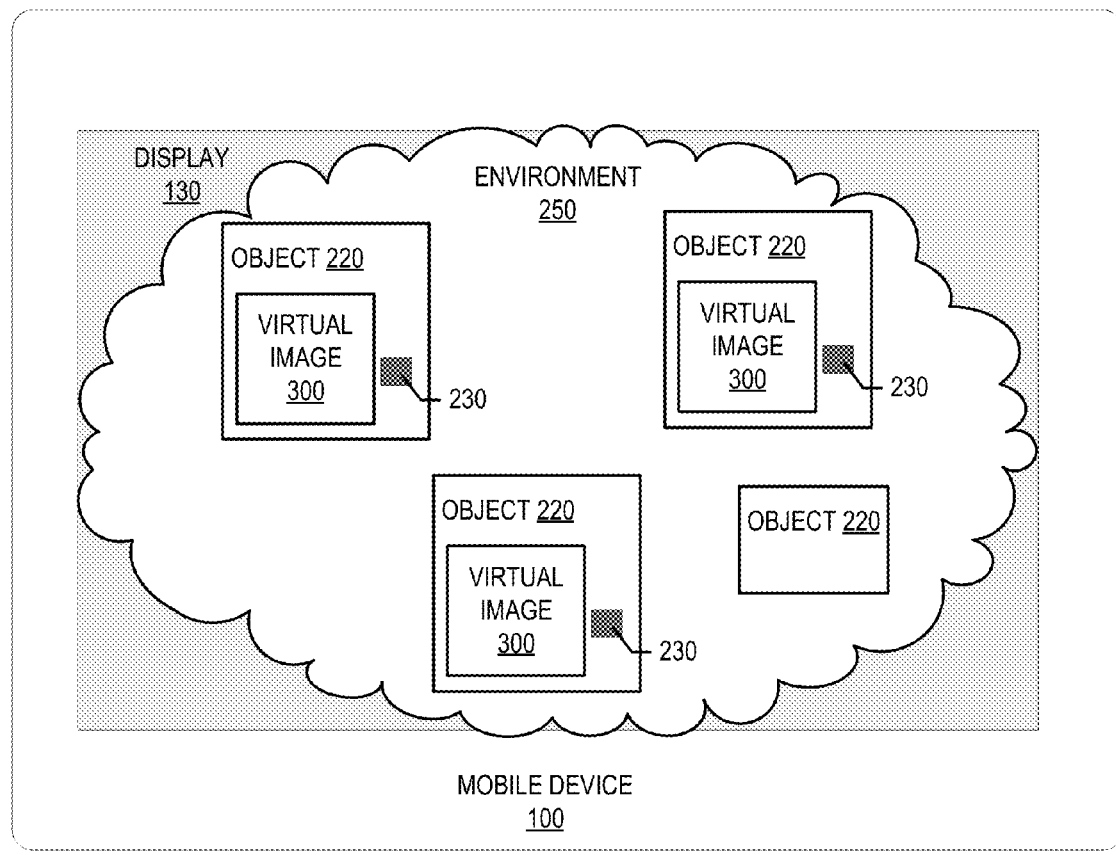
Figure 4:
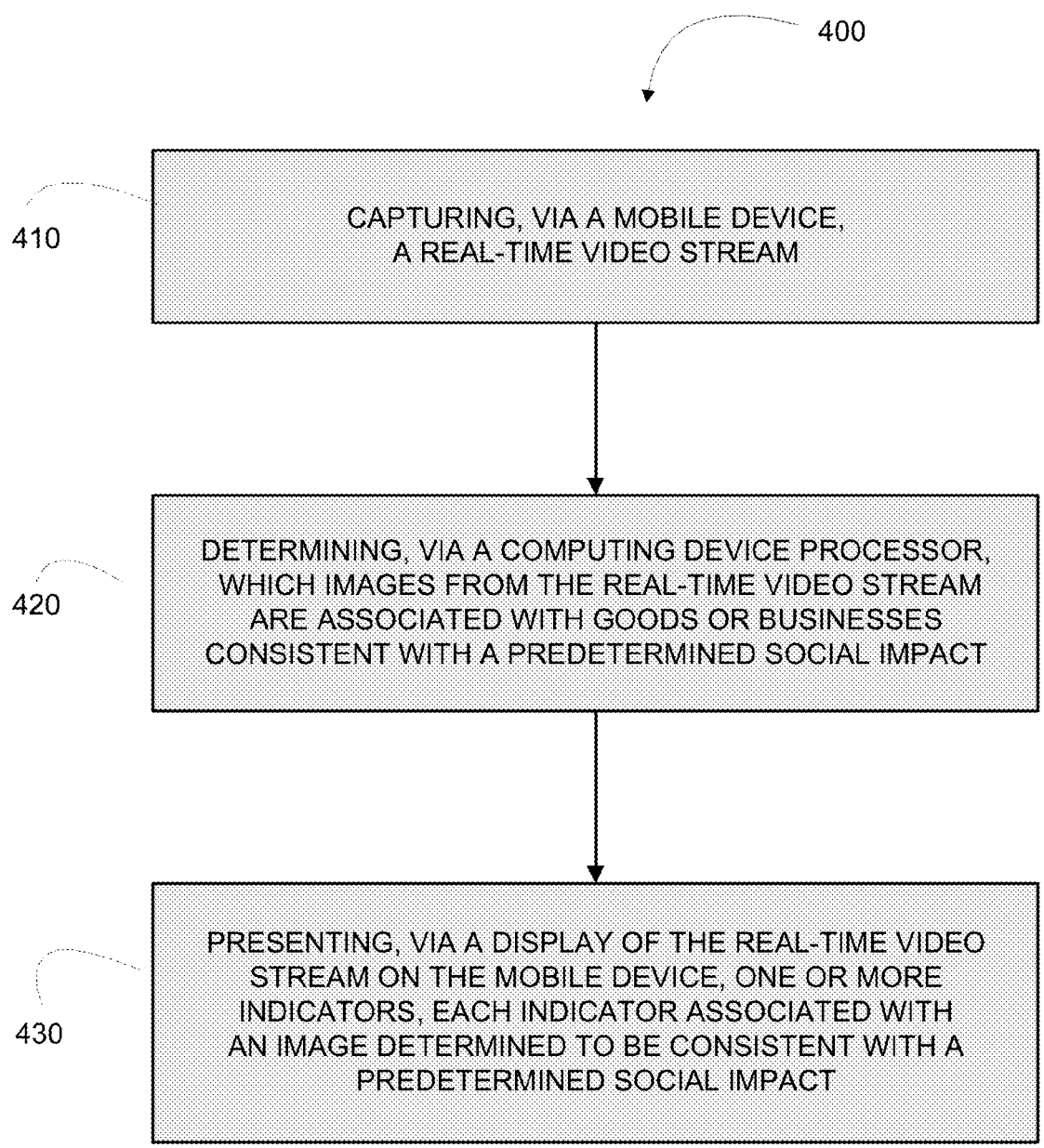
Figure 5:
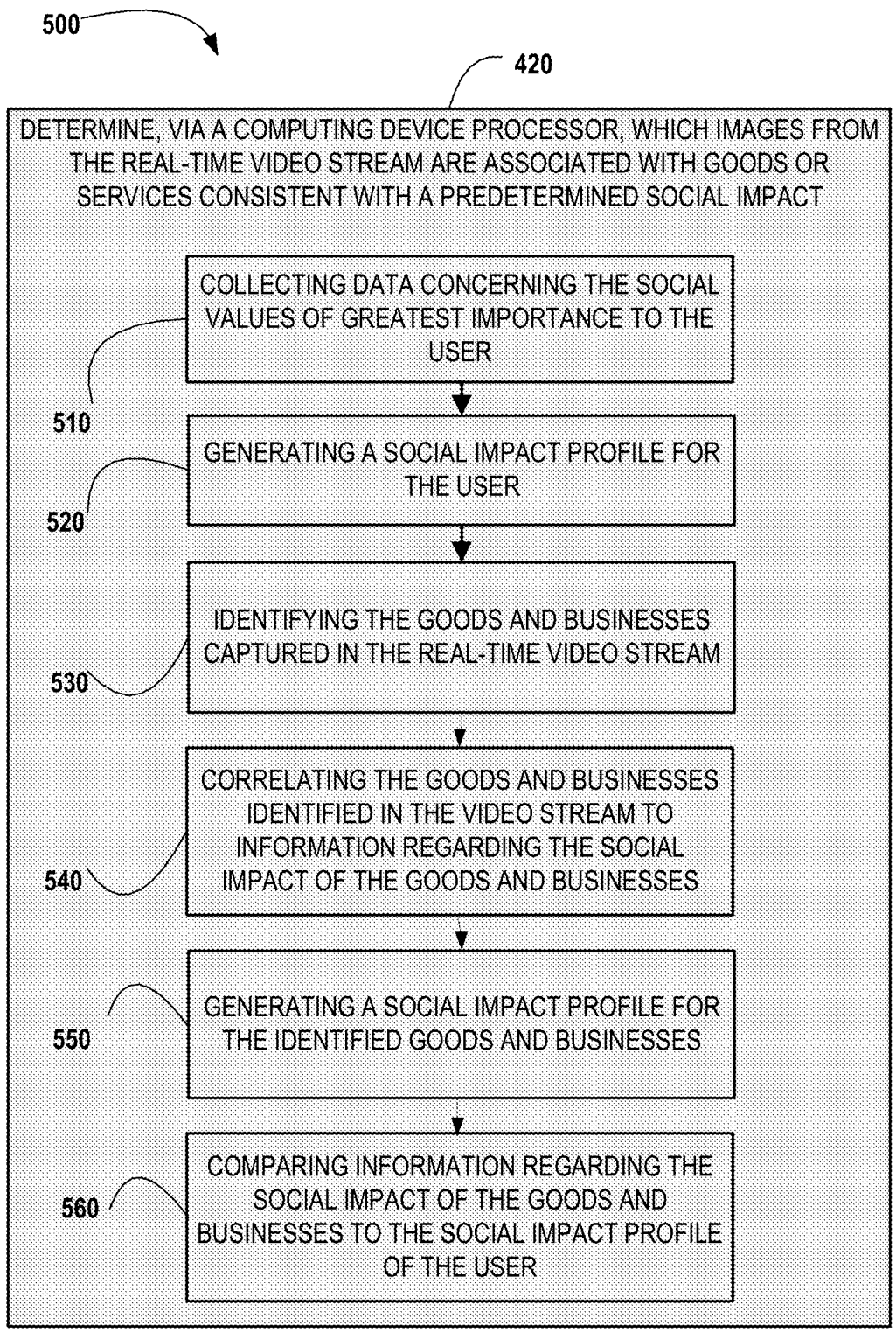
Figure 6:
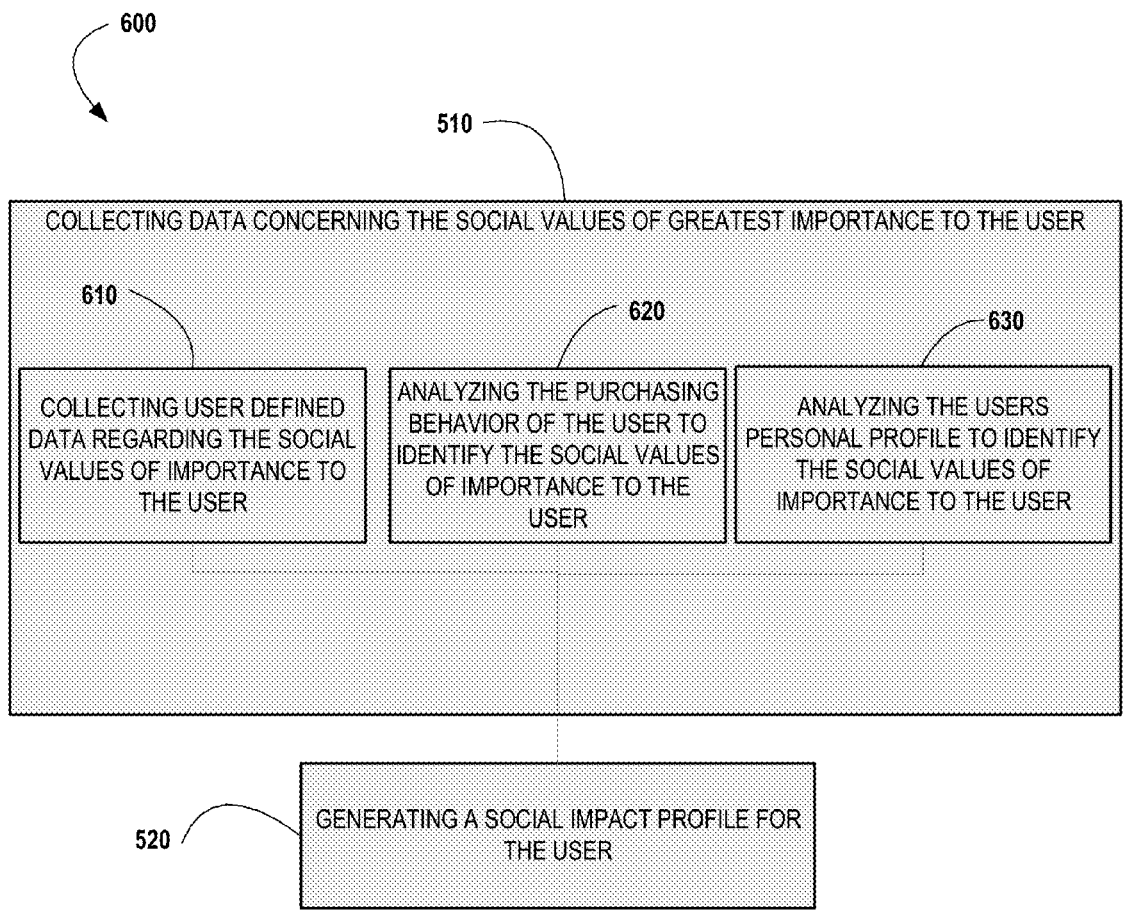
Figure 7:
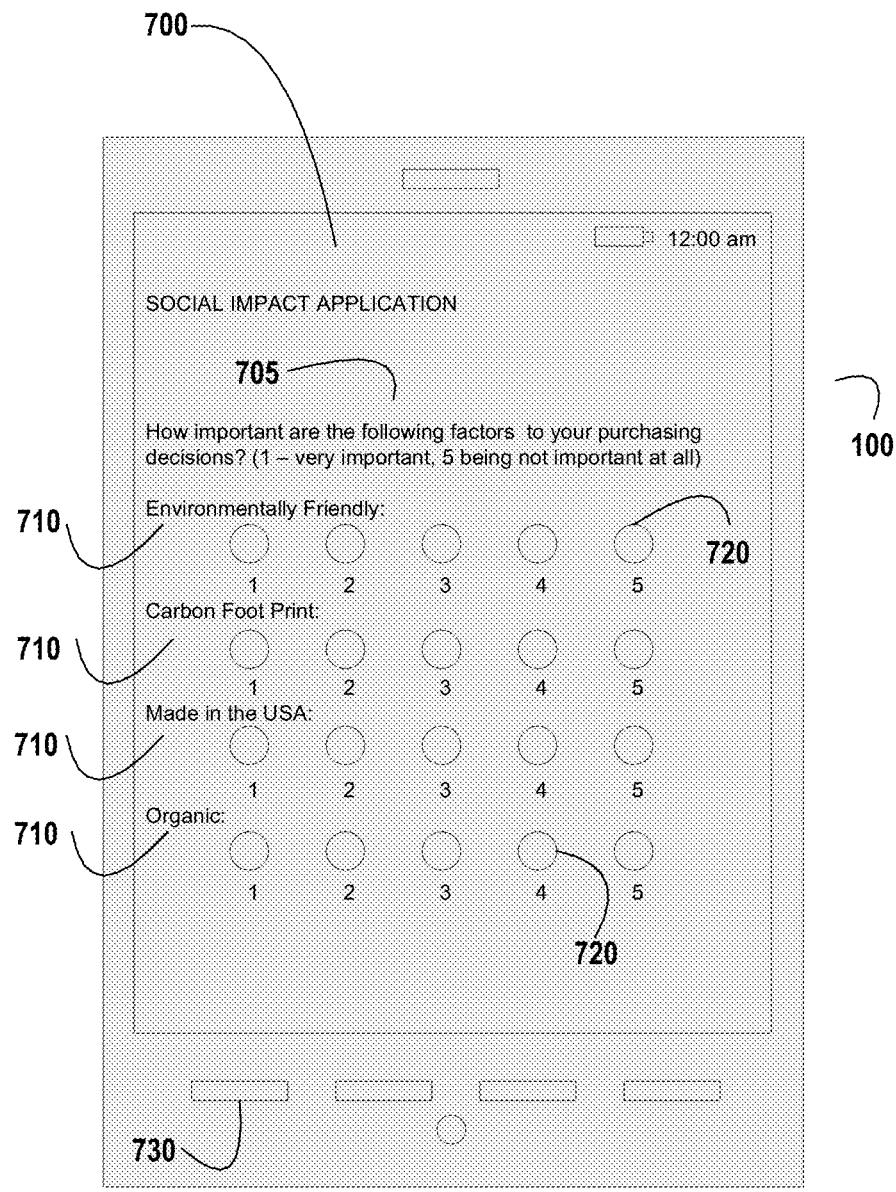
Figure 8:
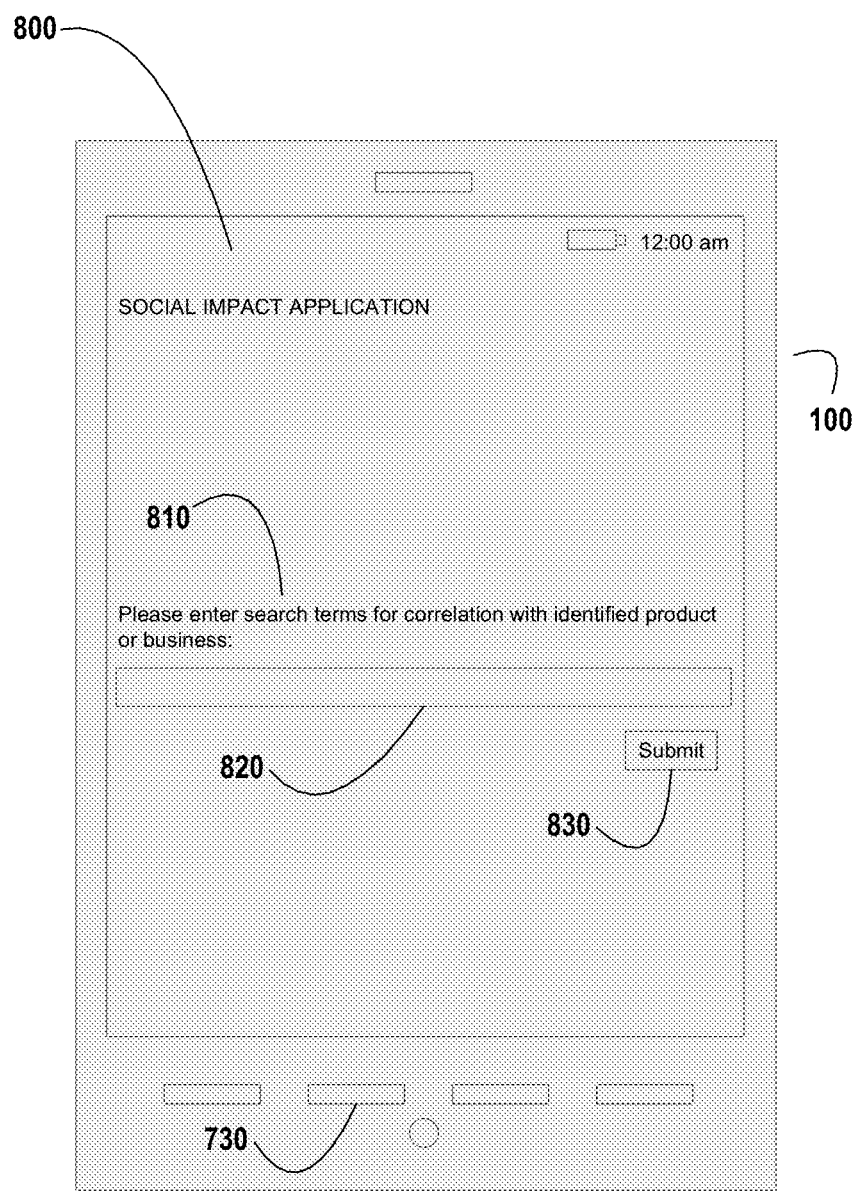
Figure 9:
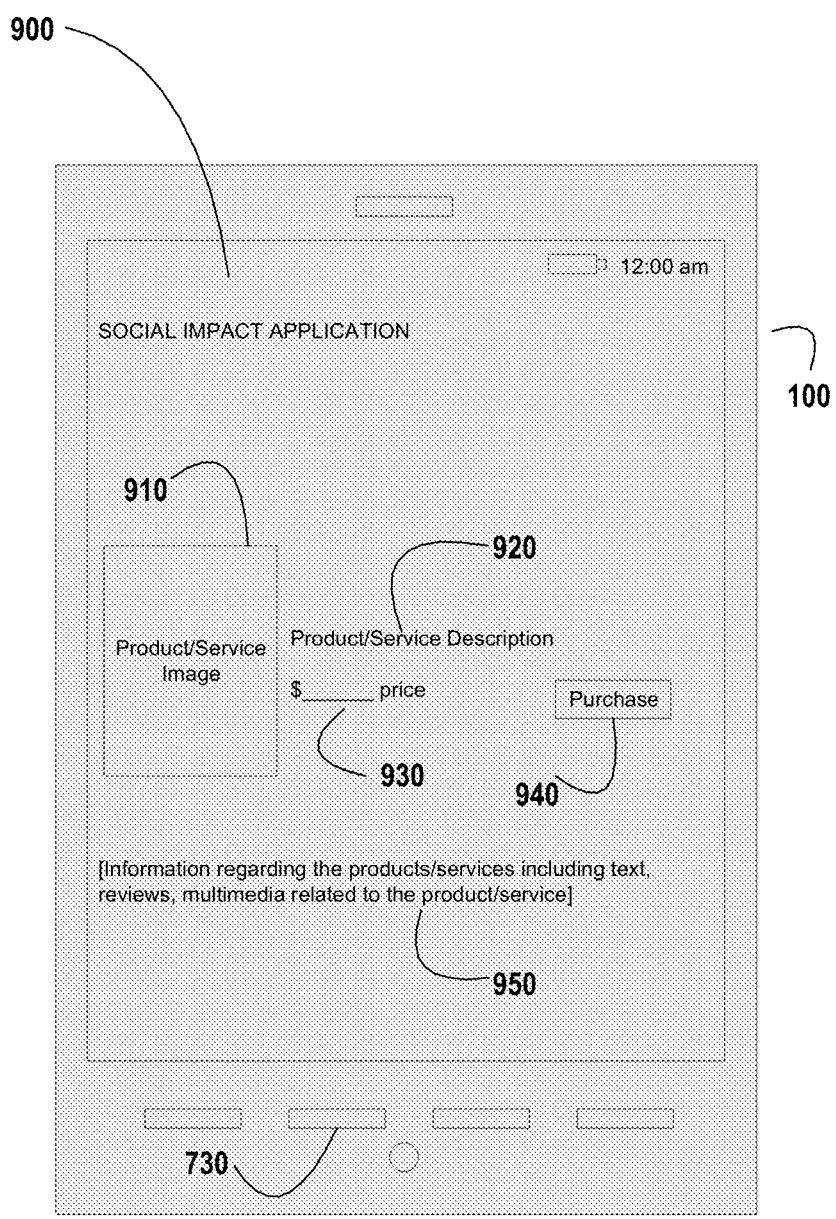

Having thus described embodiments of the invention in general terms, reference will now be made to the accompanying drawings, which are not necessarily drawn to scale, and wherein:

FIG. 1 is a block diagram illustrating a mobile device, in accordance with an embodiment of the invention;

FIG. 2 is a block diagram illustrating an object recognition environment, in accordance with an embodiment of the invention;

FIG. 3 is a block diagram illustrating a mobile device, in accordance with an embodiment of the invention;

FIG. 4 is a flow diagram illustrating a process flow for an apparatus for providing social impact information in association with identified products or businesses in accordance with an embodiment of the invention;

FIG. 5 is a flow diagram illustrating a process flow for an apparatus for determining which images from a real-time video stream are associated with goods or services consistent with a predetermined social impact in accordance with an embodiment of the invention;

FIG. 6 is a flow diagram illustrating a process flow for an apparatus for collecting data concerning the social values of greatest importance to a user in accordance with an embodiment of the invention;

FIG. 7 illustrates an exemplary display page of a user interface for collecting data regarding the social values of importance to the user, in accordance with an embodiment of the invention;

FIG. 8 illustrates an exemplary display page of a user interface for collecting data regarding the social values of importance to the user, in accordance with an embodiment of the invention;

FIG. 9 illustrates an exemplary display page of a user interface for purchasing products or services, in accordance with an embodiment of the invention;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for using real-time video analysis, such as AR or the like to assist the user of mobile devices with identifying social impact information of certain products and businesses. It will be understood that "social impact," as used herein, generally refers to how a product or business affects a given community or society as a whole. A product or businesses' social impact can include, but is not limited to, its environmental impact, including, carbon footprint (i.e. the amount of carbon dioxide emitted due to the consumption of fossil fuels), use of renewable resources, reliance on fossil fuels, associated waste or pollution etc.;

the nature of production, including the country of origin, types of workers, compliance with labor laws, history of employment abuses etc.; product attributes, including, whether the product is organic or incorporates known carcinogens, etc.; business attributes, including, ownership of the business, such as whether the business is locally owned, minority owned, publicly traded etc. and the charitable activities of a business, such as involvement in the community, support of specific charities, corporate donations etc.; and the like. A "social impact profile" as used herein refers to a categorization of a user, product or business to a grouping or classification that is correlated to data related to a user's social values or the social impact of a given product or business. Such a categorization can take the form of a numerical ranking, indexing, grading, grouping, typology or other organization that enables an objective comparison or correlation of social impact information.

The methods, systems, computers programs and the like disclosed herein use real-time vision object recognition, objects, logos, artwork, products, text, locations and other features that can be recognized in the real-time video stream and can be matched to data associated with such to assist the user with identifying the social impact of specific products and businesses. In specific embodiments, the data that is used to match the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile devices users in connection with real-time video stream analysis.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 4 illustrates a general process flow 400 for providing social impact information in association with identified products or businesses in accordance with an embodiment of the invention. As represented by block 410 a mobile device 100 (FIG. 1) is used to capture a real-time video stream. Then, as represented by block 420 a processor 110 (FIG. 1) determines which images from the real-time video stream are associated with goods or businesses consistent with a predetermined social impact profile. As represented by block 420, the real-time video stream is then presented on a display 130 (FIG. 3) with one or more indicators, each indicator 300 being associated with an image determined to be consistent with a predetermined social impact profile. Embodiments of the process 400, and systems and apparatus for performing the process 400, are described in greater detail below with reference to FIGS. 1-9.

FIG. 1 illustrates an embodiment of a mobile device 100 that may be configured to execute object recognition and AR functionality, in accordance with specific embodiments of the present invention. A "mobile device" 100 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, wearable computer or the like.

The mobile device 100 may generally include a processor 110 communicably coupled to such components as a memory 120, user output devices 136, user input devices 140, a network interface 160, a power source 115, a clock or other timer 150, a camera 170, a positioning system device 175, one or more integrated circuits 180, etc.

In some embodiments, the mobile device and/or the server access one or more databases or datastores (not shown in FIG. 1) to search for and/or retrieve information related to an object and/or marker as discussed herein. In some embodiments, the mobile device and/or the server access one or more datastores local to the mobile device and/or server and in other embodiments, the mobile device and/or server access datastores remote to the mobile device and/or server. In some embodiments, the mobile device and/or server access both a memory and/or datastore local to the mobile device and/or server as well as a datastore remote from the mobile device and/or server.

The processor 110, and other processors described herein, may generally include circuitry for implementing communication and/or logic functions of the mobile device 100. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to encode and interleave messages and data prior to modulation and transmission. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as an object recognition application 125. The object recognition application 125 may be downloaded from a server and stored in the memory 120 of the mobile device 100. Alternatively, the object recognition application 125 may be pre-installed and stored in a memory in the integrated circuit 180. In such an embodiment, the user may not need to download the object recognition application 125 from a server. In some embodiments, the processor 110 may also be capable of operating one or more applications functioning as an artificial intelligence ("AI") engine. The processor 110 may recognize objects that it has identified in prior uses by way of the AI engine. In this way, the processor 110 may recognize specific objects and/or classes of objects, and store information related to the recognized objects in one or more memories and/or databases discussed herein. Once the AI engine has thereby "learned" of an objection and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device 100 an indication that the object may be the same object previously recognized. IN this regard, the AI engine may provide a baseline or starting point from which to determine the nature of the object. In other embodiments, the AI engine's recognition of an object is accepted as the final recognition of the object.

The integrated circuit 180 may include the necessary circuitry to provide the object recognition functionality to the mobile device 100. Generally, the integrated circuit 180 will include data storage 171 which may include data associated with the objects within a real-time video stream that the object recognition application 125 identifies as having certain marker(s) (discussed in relation to FIG. 2). The integrated circuit 180 and/or data storage 171 may be an integrated circuit, a microprocessor, a system-on-a-chip, a microcontroller, or the like. As discussed above, in one embodiment, the integrated circuit 180 may provide the object recognition functionality to the mobile device 100.

Of note, while FIG. 1 illustrates the integrated circuit 180 as a separate and distinct element within the mobile device 100, it will be apparent to those skilled in the art that the object recognition functionality of the integrated circuit 180 may be incorporated within other elements in the mobile device 100. For instance, the object recognition functionality of the integrated circuit 180 may be incorporated within the mobile device memory 120 and/or processor 110. In a particular embodiment, the object recognition functionality of the integrated circuit 180 is incorporated in an element within the mobile device 100 that provides object recognition capabilities to the mobile device 100. Moreover, the functionality may be part of the firmware of the mobile device 100. Still further, the object recognition functionality of the integrated circuit 180 may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the mobile device 100 may be configured to operate with one or more air interface standards, communication protocols, modulation types, and access types. By way of illustration, the mobile device 100 may be configured to operate in accordance with any of a number of first, second, third, and/or fourth-generation communication protocols and/or the like. For example, the mobile device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 100 may also be configured to operate in accordance with non-cellular communication mechanisms, such as via a wireless local area network (WLAN) or other communication/data networks.

The network interface 160 may also include an object recognition interface 173 in order to allow a user to execute some or all of the above-described processes with respect to the object recognition application 125 and/or the integrated circuit 180. The object recognition interface 173 may have access to the hardware, e.g., the transceiver, and software previously described with respect to the network interface 160. Furthermore, the object recognition interface 173 may have the ability to connect to and communicate with an external data storage on a separate system within the network as a means of recognizing the object(s) in the video stream.

As described above, the mobile device 100 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the mobile device 100 to receive data from a user 110, may include any of a number of devices allowing the mobile device 100 to receive data from a user, such as a keypad, keyboard, touch-screen, touchpad, microphone, mouse, joystick, stylus, other pointer device, button, soft key, and/or other input device(s).

The mobile device 100 may further include a power source 115. Generally, the power source 115 is a device that supplies electrical energy to an electrical load. In one embodiment, power source 115 may convert a form of energy such as solar energy, chemical energy, mechanical energy, etc. to electrical energy. Generally, the power source 115 in a mobile device 100 may be a battery, such as a lithium battery, a nickel-metal hydride battery, or the like, that is used for powering various circuits, e.g., the transceiver circuit, and other devices that are used to operate the mobile device 100. Alternatively, the power source 115 may be a power adapter that can connect a power supply from a power outlet to the mobile device 100. In such embodiments, a power adapter may be classified as a power source "in" the mobile device.

The mobile device 100 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the mobile device 100 described herein. For example, the memory 120 may include such applications as an AR application 121 (described herein in relation to FIG. 3), a web browser application 122, an SMS application 123, an email application 124, an object recognition application 125, etc.

Referring to FIG. 2, a block diagram illustrating an object recognition experience 200 in which a user 210 utilizes a mobile device 100 to capture real-time video of an environment 250 is shown. As denoted earlier, the mobile device 100 may be any mobile communication device. The mobile device 100 has the capability of capturing real-time video of the surrounding environment 250. The real-time video capture may be by any means known in the art. In one particular embodiment, the mobile device 100 is a mobile telephone equipped with a camera 170 capable of video capture.

The environment 250 contains a number of objects 220. Some of such objects 220 may include a marker 230 identifiable to the mobile device 100. A marker 230 may be anything that is a distinguishing feature that can be interpreted by the mobile device 100 to identify specific objects 220. For instance, a marker 230 may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 100 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc. of the object 220.

In some embodiments, the marker 230 is not actually a physical marker located on or being broadcast by the object. For instance, the marker 230 may be some type of identifiable feature that is an indication that the object 220 is nearby. In some embodiments, the marker 230 for an object 220 may actually be the marker 230 for a different object 220 (e.g. a tag or placard near the object). In some embodiments, the marker 230 for an object 220 may actually be the marker 230 for a different object 220. For example, the mobile device 100 may recognize a particular building as being "Building A." Data stored in the data storage 171 may indicate that "Building B" is located directly to the east and next to "Building A." Thus, markers 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 100 to interpret to a desired confidence level what the object is. For another example, the mobile device 100, object recognition application 125 and/or AR application 121 may be used to identify a particular person as a first character from a popular television program, and thereafter utilize the information that the first character is nearby features of other characters to interpret that a second character, a third character etc. are nearby, whereas without the identification of the first character, the features of the second and third characters may not have been used to identify the second and third characters. This example may be applied to objects or businesses rather than people.

The marker 230 may also be or include social network data, such as data retrieved or communicated from the Internet, such as micro-blog entries, blog posts, social networking site posts, various types of messages and/or the like. In other embodiments, the marker 230 is provided in addition to social network data as mentioned above. For example, the mobile device 100 may capture a video stream and/or one or more still shots including a large gathering of people. In this example, as above, one or more people dressed as characters in costume may be present at a specified location. The mobile device 100, object recognition application 125 and/or AR application 121 may identify several social network indicators, such as posts, blogs, micro-blog entries, messages, and/or the like indicating the presence of one or more of the specific characters at the specified location. In this way, the mobile device 100 and associated applications may communicate information regarding the social media communications to the user and/or use the information regarding the social media communications in conjunction with other methods of object recognition. For example, the mobile device 100, object recognition application 125 and/or AR application 121 performing recognition of the characters at the specified location may confirm that the object being identified is in fact the correct character based on the retrieved social media communications. This example may also be applied to objects or businesses rather than people.

In some embodiments, the mobile device and/or server accesses one or more other servers, social media networks, applications and/or the like in order to retrieve and/or search for information useful in performing object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 220 with markers 230 only include a single marker 230, it will be appreciated that the object 220 may have any number of markers 230 with each equally capable of identifying the object 230. Similarly, multiple markers 230 may be identified by the mobile device 100 such that the combination of the markers 230 may be utilized to identify the object 220. For example, the mobile device 100 may utilize facial recognition markers 230 to identify a person and utilize a separate marker 230, such as the clothes the person is wearing to confirm the identification to the desired confidence level that the person is in fact the person the mobile device 100 identified. For example, the facial recognition marker 230 may identify the person as a famous athlete and utilize the uniform the person is wearing to confirm that the identified person is in fact the famous athlete.

In some embodiments, a marker 230 may be the location of the object 220. In such embodiments, the mobile device 100 may utilize Global Positioning System ("GPS") hardware and/or software or some other location determining mechancim to determine the location of the user 210 and/or object 220. As noted above, a location-based marker 230 could be utilized in conjunction with other non-location-based markers 230 identifiable and recognized by the mobile device 100 to identify the object 230. However, in some embodiments, a location-based marker 230 may be the only marker 230. For instance, in such embodiments, the mobile device 100 may utilize GPS software to determine the location of the user 210 and a compass device or software to determine what direction the mobile device 100 is facing in order to identify the object 220. In still further embodiments, the mobile device 100 does not utilize any GPS data in the identification. In such embodiments, markers 230 utilized to identify the object 220 are not location-based.

FIG. 3 illustrates a mobile device 100, specifically the display 130 of the mobile device 100, wherein the user 210 has executed an object recognition application 125 and AR application 121 to present within the display 130 indications of recognized objects within a real-time video stream (i.e. the surrounding environment 250). The mobile device 100 is configured to utilize markers 230 to identify objects 220, such as products that are made in the USA, the specific ingredients and/or relative amounts of ingredients of the product, if the product is made with recycled materials, and the like. Thereafter, the mobile device 100 is configured to indicate to the user 210 identified objects 220 by displaying a virtual image 300 on the mobile device display 130. As illustrated, if an object 220 does not have any markers 230 (or insufficient markers 230 to yield object identification), the object 220 will be displayed without an associated virtual image 300.

The mobile device 100 may use any type of means in order to identify desired objects 220. For instance, the object recognition application 125 may utilize one or more pattern recognition algorithms to analyze objects in the environment 250 and compare with markers 230 in data storage 171 which may be contained within the mobile device 100 (such as within the integrated circuit 180) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the mobile device 100, in some embodiments by utilizing the AR application 121 is configured to superimpose a virtual image 300 on the mobile device display 130. The virtual image 300 is generally a tab or link displayed such that the user 210 may "select" the virtual image 300 and retrieve information related to the identified object. The information may include any desired information associated with the selected object and may range from basic information to greatly detailed information. In some embodiments, the virtual image 300 may provide the user 210 with an internet hyperlink to further information on the object 220. The information may include, for example, all types of media, such as text, images, clipart, video clips, movies, or any other type of information desired. In yet other embodiments, the virtual image 300 information related to the identified object may be visualized by the user 210 without "selecting" the virtual image 300.

In embodiments in which the virtual image 300 provides an interactive tab to the user 210, the user 210 may select the virtual image 300 by any conventional means for interaction with the mobile device 100. For instance, in some embodiments, the user 210 may utilize an input device 140 such as a keyboard to highlight and select the virtual image 300 in order to retrieve the information. In a particular embodiment, the mobile device display 130 includes a touch screen that the user may employ to select the virtual image 300 utilizing the user's finger, a stylus, or the like.

In some embodiments, selecting the virtual image 300 will cause the AR Application 121 to present the user 210 with the opportunity to purchase the object associated with the virtual image. In some instances, the order functionality may be a part of the AR Application 121. In other embodiments, the AR Application may access the user's accounts associated with a financial institution enabling the user 210 to purchase the object 220 without having to input data such as a credit card number of billing address. In other embodiments, when the user 210 selects the virtual image 300 to purchase the product, the AR Application 121 will activate the web browser application 122 to allow the user to purchase the product over the Internet from a website associated with the object 220.

In some embodiments, the virtual image 300 is not interactive and simply provides information to the user 210 by superimposing the virtual image 300 onto the display 130. For example, in some instances it may be beneficial for the AR application 121 to merely identify an object 220, providing the object's name/title and giving brief information about the object, etc., rather than provide extensive detail that requires interaction with the virtual image 300. The mobile device 100 is capable of being tailored to a user's desired preferences.

Furthermore, the virtual image 300 may be displayed at any size on the mobile device display 130. The virtual image 300 may be small enough that it is positioned on or next to the object 220 being identified such that the object 220 remains discernable behind the virtual image 220. Additionally, the virtual image 300 may be semi-transparent such that the object 220 remains discernable behind the virtual image. In other embodiments, the virtual image 220 may be large enough to completely cover the object 220 portrayed on the display 130. Indeed, in some embodiments, the virtual image 220 may cover a majority or the entirety of the mobile device display 130.

The user 210 may opt to execute the object recognition application 125 and AR application 121 at any desired moment and begin video capture and analysis. However, in some embodiments, the object recognition application 125 and the AR application 121 includes an "always on" feature in which the mobile device 100 is continuously capturing video and analyzing the objects 220 within the video stream. In such embodiments, the object recognition application 125 may be configured to alert the user 210 that a particular object 220 has been identified. The user 210 may set any number of user preferences to tailor the object recognition and AR experience to their needs. For instance, the user 220 may opt to only be alerted if a certain particular object 220 is identified. The user 220 may also opt to have the video captured upon a specific manipulation of the system, hand gesture, voice commend, etc. by the user 220. Additionally, it will be appreciated that the "always on" feature in which video is continuously captured may consume the mobile device power source 115 more quickly. Thus, in some embodiments, the "always on" feature may disengage if a determined event occurs such as low power source 115, low levels of light for an extended period of time (e.g., such as if the mobile device 100 is in a user's pocket obstructing a clear view of the environment 250 from the mobile device 100), if the mobile device 100 remains stationary (thus receiving the same video stream) for an extended period of time, the user sets a certain time of day to disengage, etc. Conversely, if the "always on" feature is disengaged due to the occurrence of such an event, the user 210 may opt for the "always on" feature to re-engage after the duration of the disengaging event (e.g., power source 115 is re-charged, light levels are increased, etc.).

In some embodiments, the user 210 may identify objects 220 that the object recognition application 125 does not identify and add it to the data storage 171 with desired information in order to be identified and/or displayed in the future. For instance, the user 210 may select an unidentified object 220 and enter a name/title and/or any other desired information for the unidentified object 220. In such embodiments, the object recognition application 125 may detect/record certain markers 230 about the object 220 so that the pattern recognition algorithm(s) (or other identification means) may detect the object 220 in the future. Furthermore, in cases where the object information is within the data storage 171, but the object recognition application 125 fails to identify the object 220 (e.g., one or more identifying characteristics or markers 230 of the object has changed since it was added to the data storage 171 or the marker 230 simply was not identified), the user 210 may select the object 220 and associate it with an object 220 already stored in the data storage 171. In such cases, the object recognition application 125 may be capable of updating the markers 230 for the object 220 in order to identify the object in future real-time video streams.

In addition, in some embodiments, the user 210 may opt to edit the information or add to the information provided by the virtual object 300. For instance, the user 210 may opt to include user-specific information about a certain object 220 such that the information may be displayed upon a future identification of the object 220. Conversely, in some embodiments, the user may opt to delete or hide an object 220 from being identified and a virtual object 300 associated therewith being displayed on the mobile device display 130.

Furthermore, in some instances, an object 220 may include one or more markers 230 identified by the object recognition application 125 that leads the object recognition application 125 to associate an object with more than one object in the data storage 171. In such instances, the user 210 may be presented with the multiple candidate identifications and may opt to choose the appropriate identification or input a different identification. The multiple candidates may be presented to the user 210 by any means. For instance, in one embodiment, the candidates are presented to the user 210 as a list wherein the "strongest" candidate is listed first based on reliability of the identification. Upon input by the user 210 identifying the object 220, the object recognition application 125 may "learn" from the input and store additional markers 230 in order to avoid multiple identification candidates for the same object 220 in future identifications.

Additionally, the object recognition application 125 may utilize criteria for identification other than identification algorithms. For instance, the object recognition application 125 may utilize the user's location, time of day, season, weather, speed of location changes (e.g., walking versus traveling), "busyness" (e.g., how many objects are in motion versus stationary in the video stream), social networking updates, as well any number of other conceivable factors in determining the identification of objects 220. Moreover, the user 210 may input preferences or other metrics for which the object recognition application 125 may utilize to narrow results of identified objects 220.

In some embodiments, the AR application 121 may have the ability to gather and report user interactions with displayed virtual objects 300. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

FIG. 5 illustrates a process flow 500 for determining which objects 220 (FIGS. 2 and 3) from the real-time video stream are associated with goods or business consistent with a predetermined social impact profile, in accordance with an embodiment of the invention. As represented by block 510, data is collected concerning the social values of greatest importance to the user and this data is used to generate a social impact profile for the user, as represented by block 520. Block 530 represents the identification of goods and businesses captured in the real-time video stream consistent with the systems and apparatus discussed above and illustrated in FIGS. 1-3.

As represented by block 540 the goods and businesses identified in the real-time video stream are correlated to information regarding the social impact of the goods and businesses. This information is used to assign the identified goods and businesses a social impact profile, as represented in block 550. In some embodiments of the invention, the information regarding the social impact of the goods and businesses may be dynamically collected by using search algorithms to pair the markers 230 to information in existing data sources related to the social impact information about the goods or businesses. Such data sources may include, but are not limited to, the Internet, legal records, news databases, and the like. In some embodiments a database will be specifically created to catalog the social impact information of goods and businesses. In some embodiments this social impact database may be stored on the Data Storage 171 of the mobile device 100 to be accessed by the processor 110 as part of the object recognition application 125. In some embodiments, the social impact database may be provided to the system through an API. In this way, the data may be stored in a separate API and be implemented by request from the mobile device and/or server accesses another application by way of an API. In some embodiments, a financial institution may use its unique relationship with both individuals and businesses to collect social impact information of goods and businesses for use in connection with apparatuses and systems performing the process flow 500. It will be understood that although process flow 500 illustrates the correlation of goods and businesses to information regarding the social impact of the goods and businesses 540 as a separate step from assigning a social impact profile to the goods and businesses 550 that these steps may be performed simultaneously. Moreover, one or both of these steps may be performed prior to the other steps shown in the process flow 500. In some embodiments, information regarding the social impact of goods and businesses will be collected and the goods and businesses will be assigned a social impact profile that is preloaded onto the mobile device 100.

Referring back to the process flow 500 illustrated in FIG. 5, block 560 represents the event of comparing the social impact profile of the goods or businesses to the social impact profile of the user. As discussed above, in some embodiments, the social impact profile may take the form of a numerical indicator. Accordingly, in some embodiments the numerical indicator assigned to the user will be compared to the numerical indicator assigned to the goods or business. In some embodiments, a virtual image 300 will only be shown on the display 130 if the object 220 has a social impact profile greater than the social impact profile of the user. For example, if a user is assigned a social impact profile of forty-two on a scale of one hundred for environmental concerns and an identified product has a social impact profile of fifty-five a virtual image 300 for the product will be shown on the display 130 of the mobile device 100. If however, the product has score of thirty-five, no virtual image 300 will be shown on the display 100. It will be understood, that if the social impact profile takes an alternate form, such as a classification or grade, the comparison will proceed similarly identifying goods and businesses with a social impact profile that is at a specific level relative to the user's social impact profile. The user will be able to adjust and specify the relationship between the social impact profiles that will still generate a virtual image 300. For instance, a user may be able to specify that it will accept goods or businesses with social impact profile within a certain percentage of its own, or if classifications are used, that the user will accept goods from the classification immediately below the user's. In other embodiments, a virtual image 300 will be outlined, for example in green, if the object 220 in the display has a social impact profile appropriate to the user's assignment.

The collection of data concerning the user's social values represented in block 510 of the process flow 500 can be embodied in a number of different apparatuses and systems. FIG. 6 provides a flow diagram 600 illustrating a general process flow of an apparatus or system for collecting data concerning the social values of greatest importance to the user 510. In some embodiments, an apparatus, such as the mobile device 100 will be used to collect user defined data regarding the social values of importance to the user 610. Such user defined data may take a number of different forms, including but not limited to, responses to survey questions and questionnaires regarding social values, self-identification with specific social groups, identification of search terms that a user wants, or does not want to be associated with products or businesses, etc. In some embodiments, such user defined data may be collected directly by the mobile device 100 as part of the object recognition application 125 or through a website accessed through the web browser application 122. In some embodiments the user defined data is collected through other computer systems, or even through direct interviews with the user and are subsequently transferred to the data storage 171.

As represented by block 620 the apparatus or system may analyze the purchasing behavior of the user to identify the social values of importance to the user. Past purchasing behavior may be a good indicator of the social values of greatest importance to a user, or at a minimum reflect the social impact values on which a user is prepared to act. Although information regarding purchasing behavior may be collected from different sources, in some embodiments, a financial institution will utilize its relationship with its customers to collect and analyze the user's purchasing behavior. If a user has an account with a financial institution, the financial institution will have access to transaction information for purchases made by the user from that account. Such transaction information may include the date, time, location, amount, nature, product details (i.e. merchant category code), and provider of products or services purchased. This transaction information can then be compared to information relating to the social impact of specific products and businesses. In some embodiments, this information will be the same information as represented in block 540 for process flow 500 in FIG. 5 and discussed above. Accordingly, a database may be created by the financial institution or another entity cataloging the social impact of various goods and businesses or the information may be collected dynamically from existing sources. The financial institution can then compare the user's transaction data to the available social impact information. For example, if a high percentage of a user's purchases, either with regard to dollar amount or frequency, are from a grocery store that is identified as having a social impact profile associated with selling organic goods, the apparatus or system may categorize the user as valuing organic products. If a user has used an account to make donations to a non-profit organization, the apparatus may categorize the user as valuing charitable giving or may associate the user with the specific social values identified with the non-profit organization that received the donation.

In some embodiments of the invention, the use of purchasing behavior to collect information regarding the social values of greatest importance to the user will also allow the user to gain information regarding the user's own activities or habits. In some embodiments, the object recognition application 125 or some other application on the memory 120 of the mobile device 100 or other computing system can provide a summary of the analysis of the user's purchasing behavior. For instance, the object recognition application 125 may present the user's checking account statement or credit card statement and highlight purchases that reflect a specific social impact profile or are inconsistent with a specific social impact profile. The object recognition application 125 or other program may also generate a social impact score. This score may or may not be the same as the social impact profile represented by block 520. The object recognition application 125 or other program may identify those purchases that contributed to the specific score so that the user can adjust his or her behavior to move the score in a direction consistent with the user's self-defined values. In some embodiments of the invention, the user's social impact score will be sent to social networking accounts associated with the user to enable to the user to share his or her score with friends and associates. Some embodiments of the invention will include a game feature providing incentives for improving a social impact score.

Referring back to FIG. 6, block 630 represents the process flow of analyzing the user's personal profile to identify the social values of importance to the user. As used herein "personal profile" means any information personal to the user that can be used to identify the character and quality of the person. Such information includes but is not limited to, membership in certain organizations, profile information available through any social network of the user, status updates, blog postings, comments and other information contributed by the user in an online environment, contents of e-mails etc. In some embodiments of the invention, a computer device processor will be used to monitor or browse through all electronic information related to the user and collect personal profile information associated with the user's social values. In some embodiments, a financial institution will use the information it has access to by nature of its relationship with its customers to collect a user's personal profile information. Some personal profile information is provided directly to the financial institution through the process of establishing accounts and doing business with the financial institution. The financial institution may also have access to certain transaction information that indicates personal profile information related to the user's social values, such as the payment of membership dues to certain organizations or the contribution of funds to a non-profit organization.

As with the analysis of purchasing behavior represented in block 620, the analysis of personal profile information represented in block 630 will allow the user, in certain embodiments to gain information about the user's social values. In certain embodiments, the object recognition application 125 or other program on the mobile device 100 or other computing system will present to the user the effect certain personal profile information has on the determination of the user's social values. For instance, the object recognition application 125 may highlight information from a user's blog post or social networking profile that indicates the user values local businesses.

Referring now to FIGS. 7-9, a series of exemplary display pages 700 and 800 of a mobile device 100 consistent with an embodiment of the present invention are provided. It will be understood, that in some embodiments, each of the pages 700 and 800 are displayed on the display 130 of the mobile device 100. It will also be understood that the mobile device 100 is configured, in some embodiments to navigate from page 700 to page 800 and/or vice versa either by actuating one of the buttons 730 or one of the other input devices 140. It will be further understood that the display pages 700 and 800 can be embodied as portions of the object recognition application 125, the AR Application 121, as Internet web pages and/or the like. In addition, it will be understood that, in some embodiments, the apparatus having the process flow 400, 500 and 600 are configured to implement any one or more of the embodiments of the present invention described and/or contemplated herein in connection with the display pages 700 and 800.

Referring now to FIG. 7, it will be understood that in some embodiments, the display page 700 is displayed in connection with collecting user defined data regarding the social values of importance to the user, as represented by block 610 of the apparatus having a process flow 600. Alternatively, the display page 700 is displayed after the customer navigates to the page from the other display page 800. As shown, in this embodiment, the display page 700 includes a general survey question and instructions 705, specific categories for inputting user defined responses to social impact queries 710 and response indicators 720. In the embodiment shown in display page 700, the user is asked to identify how important certain factors are to making a purchasing decision with one being very important and five being not important at all 705. The specific factors are presented at 710 and the user indicates his or her response by actuating one response indicator 720 for each category. Once the user has provided a response for each category, the application or program will provide an additional question to solicit information regarding the social values of the customer or the customer will be able to navigate to one of other display pages, such as display page 800.

Referring now to FIG. 8, it will be understood that in some embodiments, the display page 800 is displayed in connection with collecting user defined data regarding the social values of importance to the user as represented by block 610 of the apparatus having a process flow 600. Alternatively, the display page 800 is displayed after the user navigates to the page from the other display page 700. As shown, in this embodiment, the display page 800 includes instructions 810 a field for inputting search terms 720 and a button 830 for submitting the search terms for use in connection with identification of products or businesses having a predetermined social impact as discussed herein. In this embodiment, the user may input any terms that the user either wants to be associated with specific products or businesses or does not want to be associated with specific products or businesses. The user has the option of selecting whether the AR Application 121 returns virtual images 300 for goods positively or negatively associated with the search terms (not shown). For instance, the user may enter the terms "environmentally friendly" or "locally grown" in the search field 820 and select the input for positive association and the object recognition application 125 will identify goods in the real-time video stream that have been identified as being environmentally friendly or locally grown and the AR Application 121 may superimpose a virtual image 300 on the display over the corresponding image of such goods. The user may also enter "blood diamond" in the search field 820 and select the input for negative association and the object recognition application 125 will exclude any goods or businesses that have been associated with diamonds removed from certain conflict zones or mined in certain geographic locations. It will be understood that the search terms can be combined using conventional Boolean operators and the like.

Referring now to FIG. 9, which is an exemplary display page 900 of a mobile device 100 consistent with an embodiment of the present invention. It will be understood, that in some embodiments, the display page 900 is displayed on the display 130 of the mobile device 100. It will also be understood that the display pages 900 can be embodied as portions of the object recognition application 125, the AR Application 121, as Internet web pages and/or the like. In addition, it will be understood that, in some embodiments, the apparatus having the process flow 400, 500 and 600 are configured to implement any one or more of the embodiments of the present invention described and/or contemplated herein in connection with the display pages 900.

The display page 900 of FIG. 9, in some embodiments is displayed in connection with an apparatus performing block 430 of the process flow 400. Referring to FIG. 3, after identifying an object 220 within the real-time video stream, the mobile device 100 is configured to superimpose a virtual image 300 on the mobile device display 130. In some embodiments selecting the virtual image 300 navigates the user to display page 900 to enable the user to purchase the identified product or service. As shown, in this embodiment, the display page 900 includes an image of the product or service 910 a description of the product or service 920 the price of the product or service 930 and a button to initiate the purchase of the product or service 940. The display page 900 may also include additional information 950 regarding the product or service, including such things as reviews, specifications, instructions and multimedia relating to the product or service. In certain embodiments of the invention, selecting the button 940 will navigate the user to an additional display page (not shown) where the user can enter information, such as credit card numbers and billing addresses, to complete the purchase. In other embodiments, the AR Application will be linked to the financial institution of the user so by actuating the button 940 the purchase is automatically completed and no additional information is required from the user.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
|---|---|---|
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer implemented method of providing social impact information of goods and services providers that are consistent with a predetermined social impact profile, the computer implemented method comprising:

generating a predetermined social impact profile based on input from a user regarding the user's self-defined social impact values;

capturing a real-time video stream of a surrounding environment using a video capture device associated with a mobile device of the user, wherein the real-time video stream comprises images of one or more goods or service providers;

identifying, via a processor, one or more goods or service providers proximate in location to the mobile device, based on analyzing the captured real-time video stream for one or more identifying markers associated with the one or more goods or service providers;

determining, via the processor, which goods or service providers proximate in location to the mobile device are consistent with the predetermined social impact profile;

presenting, via a display device, one or more indicators within a presentation of the real-time video stream of the surrounding environment, each indicator of the one or more indicators being associated with a good or service provider proximate in location to the mobile device determined to be consistent with the predetermined social impact profile, the indicator comprising a virtual image superimposed on the image of the good or service provider presented in the real-time video stream;

presenting, via the display device, a checking account statement of the user of the mobile device;

determining, via the processor, which of one or more transactions conducted between the user and the one or more identified goods or service providers are consistent with the predetermined social impact profile;

generating, via the processor, a social impact score of the user based on the determined one or more transactions conducted between the user and the one or more identified goods or service providers that are consistent with the predetermined social impact profile and based in part on one or more transactions that are inconsistent with the predetermined social impact profile;

determining, via the processor, which of the determined transactions were used to generate the social impact score, resulting in a first set of transactions;

determining, via the processor, which of the transactions that are inconsistent with the predetermined social impact profile were used to generate the social impact score, resulting in a second set of transactions, wherein the first set of transactions and the second set of transactions together make up a third set of transactions;

identifying, via the processor, any purchases associated with any of the third set of transactions;

presenting, via the display device to the user, the identified purchases, wherein the user may use the identified purchases to adjust the user's behavior to move the determined social impact score in a direction consistent with the user's self-defined social impact values;

transmitting, via the processor, the generated social impact score of the user to one or more social network accounts;

determining that the mobile device is associated with at least one trigger event, wherein the trigger event comprises: (i) the mobile device being exposed to predetermined low levels of illumination for a first predetermined extended period of time, (ii) the mobile device being stationary for a second predetermined extended period of time or (iii) a power source of the mobile device being associated with predetermined low power levels;

disengaging the continuous capture of the real-time video stream of the surrounding environment, based on the at least one trigger event; and re-engaging, automatically, the continuous capture of the real-time video stream of the surrounding environment, based on determining that the mobile device is not associated with the at least one trigger event.

2. The computer implemented method of claim 1, wherein capturing the real-time video stream further comprises implementing, via the processor, object recognition processing to identify the goods or service providers within the real-time video stream.

3. The computer implemented method of claim 1, wherein identifying one or more goods or service providers further comprises capturing a code located on or proximate to one or more of the products or service providers, wherein the code identifies the product or service provider.

4. The computer implemented method of claim 1, wherein identifying one or more goods or service providers further comprises receiving, via the mobile device, wireless communication from a product identifying tag or a service provider identifying tag associated with the goods or service provider.

5. The computer implemented method of claim 1, wherein identifying one or more goods or service providers further comprises determining, via the processor, a location of the mobile device and determining, via the processor, the one or more goods or service providers based on the determined location.

6. The computer implemented method of claim 1, wherein the mobile device is a mobile phone.

7. The computer implemented method of claim 1, wherein the mobile device comprises the display device that presents the one or more indicators.

8. The computer implemented method of claim 1, wherein determining which goods or service providers proximate in location to the mobile device are consistent with the predetermined social impact profile further comprises:
collecting data concerning social values of importance to the user; and
generating the social impact profile for the user.

9. The computer implemented method of claim 1, wherein determining which images from the real-time video stream are associated with goods or service providers consistent with the predetermined social impact profile further comprises:
identifying the goods and service providers captured in the real-time video stream;
correlating the goods and service providers identified in the video stream to information regarding the social impact of the goods or service providers; and
comparing the information regarding the social impact of the goods and service providers to the social impact profile of the user.

10. The computer implemented method of claim 8 wherein collecting the data concerning the social values of importance to the user comprises collecting user defined data concerning the social values of importance to the user.

11. The computer implemented method of claim 8 wherein collecting the data concerning the social values of importance to the user comprises:
analyzing purchasing behavior of the user; and
identifying the social values of importance to the user based on the purchasing behavior of the user.

12. The computer implemented method of claim 9 wherein the social impact of the goods or service providers comprises one or more of the following: an environmental impact, nature of production, product attributes, business attributes or charitable activities.

13. The computer implemented method of claim 10 wherein the user defined data comprises responses to survey questions.

14. The computer implemented method of claim 10 wherein the user defined data comprises search terms inputted by the user and the user's desired correlation between the inputted search terms and the goods or service providers.

15. The computer implemented method of claim 11 wherein the purchasing behavior comprises financial records available to a financial institution.

16. The computer implemented method of claim 1, wherein the indicators are selectable by the user.

17. The computer implemented method of claim 1, wherein the indicators, upon being selected present the user with additional information about the goods or service provider.

18. The computer implemented method of claim 1, wherein the indicators, upon being selected present the user with an option to purchase one or more of the goods or a service provided by the service provider via the mobile device.

19. A computer program product for providing social impact information of goods and services providers that are consistent with a predetermined social impact profile, the computer program product comprising:

a non-transitory computer readable storage medium having computer readable program code embodied therewith, the computer readable program code comprising:

a computer readable program code configured for generating a predetermined social impact profile based on input from a user regarding the user's self-defined social impact values;

a computer readable program code configured for capturing a real-time video stream of a surrounding environment using a video capture device associated with a mobile device of the user, wherein the real-time video stream comprises images of one or more goods or service providers;

a computer readable program code configured for identifying, via a processor, one or more goods or service providers proximate in location to the mobile device, based on analyzing the captured real-time video stream for one or more identifying markers associated with the one or more goods or service providers;

a computer readable program code configured for determining, via the processor, which goods or service providers proximate in location to the mobile device are consistent with the predetermined social impact profile;

a computer readable program code configured for presenting, via a display device, one or more indicators within a presentation of the real-time video stream of the surrounding environment, each indicator of the one or more indicators being associated with a good or service provider proximate in location to the mobile device determined to be consistent with the predetermined social impact profile, the indicator comprising a virtual image superimposed on the image of the good or service provider presented in the real-time video stream;

a computer readable program code configured for presenting, via the display device, a checking account statement of the user of the mobile device;

a computer readable program code configured for determining, via the processor, which of one or more transactions conducted between the user and the one or more identified goods or service providers are consistent with the predetermined social impact profile;

a computer readable program code configured for generating, via the processor, a social impact score of the user based on the determined one or more transactions conducted between the user and the one or more identified goods or service providers that are consistent with the predetermined social impact profile and based in part on one or more transactions that are inconsistent with the predetermined social impact profile;

a computer readable program code configured for determining, via the processor, which of the determined transactions were used to generate the social impact score, resulting in a first set of transactions;

a computer readable program code configured for determining, via the processor, which of the transactions that are inconsistent with the predetermined social impact profile were used to generate the social impact score, resulting in a second set of transactions, wherein the first set of transactions and the second set of transactions together make up a third set of transactions;

a computer readable program code configured for identifying, via the processor, any purchases associated with any of the third set of transactions;

a computer readable program code configured for presenting, via the display device to the user, the identified purchases, wherein the user may use the identified purchases to adjust the user's behavior to move the determined social impact score in a direction consistent with the user's self-defined social impact values;

a computer readable program code configured for transmitting, via the processor, the generated social impact score of the user to one or more social network accounts;

a computer readable program code configured for determining that the mobile device is associated with at least one trigger event, wherein the trigger event comprises: (i) the mobile device being exposed to predetermined low levels of illumination for a first predetermined extended period of time, (ii) the mobile device being stationary for a second predetermined extended period of time or (iii) a power source of the mobile device being associated with predetermined low power levels;

a computer readable program code configured for disengaging the continuous capture of the real-time video stream of the surrounding environment, based on the at least one trigger event; and a computer readable program code configured for re-engaging, automatically, the continuous capture of the real-time video stream of the surrounding environment, based on determining that the mobile device is not associated with the at least one trigger event.

20. The computer program product of claim 19, wherein the computer readable program code for capturing the real-time video stream further comprises software code for implementing, via the processor, object recognition processing to identify the goods or service providers within the real-time video stream.

21. The computer program product of claim 19, wherein the computer readable program code for identifying one or more goods or service providers further comprises software code for capturing a code located on or proximate to one or more of the products or service providers, wherein the code identifies the product or service provider.

22. The computer program product of claim 19, wherein the computer readable program code for identifying one or more goods or service providers further comprises software code for receiving, via the mobile device, wireless communication from a product identifying tag or a service provider identifying tag associated with the goods or service provider.

23. The computer program product of claim 19, wherein the computer readable program code for identifying one or more goods or service providers further comprises software code for determining, via the processor, a location of the mobile device and determining, via the processor, the one or more goods or service providers based on the determined location.

24. The computer program product of claim 19, wherein the mobile device is a mobile phone.

25. The computer program product of claim 19, wherein the mobile device comprises the display device that presents the one or more indicators.

26. The computer program product of claim 19, wherein the computer readable program code for determining which goods or service providers proximate in location to the mobile device are consistent with the predetermined social impact profile further comprises software code for:
collecting data concerning social values of importance to the user; and
generating the social impact profile for the user.

27. The computer program product of claim 19, wherein the computer readable program code for determining which images from the real-time video stream are associated with goods or service providers consistent with the predetermined social impact profile further comprises software code for:

identifying the goods and service providers captured in the real-time video stream;

correlating the goods and service providers identified in the video stream to information regarding the social impact of the goods or service providers; and comparing the information regarding the social impact of the goods and service providers to the social impact profile of the user.

28. The computer program product of claim 26 wherein the computer readable program code for collecting the data concerning the social values of importance to the user comprises software code for collecting user defined data concerning the social values of importance to the user.

29. The computer program product of claim 26 wherein the computer readable program code for collecting the data concerning the social values of importance to the user comprises software code for:

analyzing purchasing behavior of the user; and identifying the social values of importance to the user based on the purchasing behavior of the user.

30. The computer program product of claim 27 wherein the social impact of the goods or service providers comprises one or more of the following: an environmental impact, nature of production, product attributes, business attributes or charitable activities.

31. The computer program product of claim 28 wherein the user defined data comprises responses to survey questions.

32. The computer program product of claim 28 wherein the user defined data comprises search terms inputted by the user and the user's desired correlation between the inputted search terms and the goods or service providers.

33. The computer program product of claim 29 wherein the purchasing behavior comprises financial records available to a financial institution.

34. The computer program product of claim 29, wherein the indicators are selectable by the user.

35. The computer program product of claim 29, wherein the indicators, upon being selected present the user with additional information about the goods or service provider.

36. The computer program product of claim 29, wherein the indicators, upon being selected present the user with an option to purchase one or more of the goods or a service provided by the service provider via the mobile device.

\* \* \* \* \*